(12) United States Patent
Chkodrov et al.

(10) Patent No.: US 7,107,340 B2
(45) Date of Patent: Sep. 12, 2006

(54) SYSTEM AND METHOD FOR COLLECTING AND STORING EVENT DATA FROM DISTRIBUTED TRANSACTIONAL APPLICATIONS

(75) Inventors: Gueorgui B. Chkodrov, Redmond, WA (US); Richard Z. Jason, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 770 days.

(21) Appl. No.: 10/160,844

(22) Filed: May 31, 2002

(65) Prior Publication Data

US 2003/0225820 A1    Dec. 4, 2003

(51) Int. Cl.
*G06F 17/40* (2006.01)
*G06F 17/30* (2006.01)

(52) U.S. Cl. .............................. 709/224; 707/8; 714/47

(58) Field of Classification Search ................ 709/206, 709/217, 246, 223–224; 717/124, 127; 714/47; 707/8, 10
See application file for complete search history.

(56) References Cited

U.S. PATENT DOCUMENTS 5,349,662 A * 9/1994 Johnson et al. ............. 717/127
6,047,315 A * 4/2000 Tsuji et al. .................. 709/206
6,721,784 B1 * 4/2004 Leonard et al. ............. 709/206

OTHER PUBLICATIONS

Barghouti, N.S., et al., "Using event contexts and matching constraints to monitor software processes," *ICSE*, 1995, 83-92.
Cilia, M., et al., "An active functionality service for E-business applications," *SIGMOD Record*, Mar. 2002, 31(1), 24-30.
Hayton, R., et al. "Using events to build large scale distributed applications," *ACM Press*, NY, NY, 1996, 9-16.
Joyce, J., et al., "Monitoring distributed systems," *ACM Transactions on Computer Systems*, May 1987, 5(2), 121-150.
Spezialetti, M., et al., "An approach to reducing delays in recognizing distributed event occurrences," *ACM*, 1991, 155-166.
U.S. Appl. No. 10/157,968, filed May 31, 2002, Chkodrov et al.

* cited by examiner

*Primary Examiner*—Dung Dinh
(74) *Attorney, Agent, or Firm*—Woodcock Washburn LLP

(57) ABSTRACT

Event data associated with state data corresponding to an instance of a process is collected by an interceptor associated with a server that performs an operation to modify the state data. The server performs a single transaction with the database to store both the modified state data and the associated event data, the transaction either succeeding or failing, whereby if the transaction succeeds, then both the state data and the event data are stored at the database, and if the transaction fails, then both the state data and the event data are not stored at the database. The event data stored at the database is then transmitted to a tracking service for conversion into a query-able format.

22 Claims, 6 Drawing Sheets

SYSTEM AND METHOD FOR COLLECTING AND STORING EVENT DATA FROM DISTRIBUTED TRANSACTIONAL APPLICATIONS

BACKGROUND OF THE INVENTION

1. Field of the Invention

The present invention relates to distributed transactional applications such as business process orchestration technology, and, more particularly, to collecting tracking data corresponding to an instance of a business process managed by the technology.

2. Description of the Prior Art

Distributed transactional applications are applications that run in a distributed environment and persist the state of the application data in a server in a transactional manner. An example of a distributed transactional application is business process orchestration technology, which enables the automated management of multiple instances of business processes. A business orchestration product such as, for example, the BIZTALK software application from MICROSOFT corporation of Redmond, Wash. allows a user to quickly design, define, and deploy automated business processes that span programs, technologies, platforms, and business partners. For example, a user may create a business process corresponding to the process of determining whether a borrower is approved for a loan. The business process may include the steps of receiving a loan application, sending for an appraisal, receiving an appraisal, sending for a credit history, receiving a credit history, and obtaining final approval, among other things.

For each instance of a process, data corresponding to the state of the instance is stored by a database. When the state of an instance is to be changed, a server performs an operation to modify the data in the database corresponding to the state of the instance. For example, the database may store state data indicating that, for an instance corresponding to the loan application of Jim Smith, a credit reporting agency has been contacted and is in the process of preparing a credit report. When the credit report has been received, a server performs an operation to obtain the state data corresponding to the instance from the database and modify the state data to indicate that Smith's credit report has been received. The server then performs a transaction with the database to store the modified state data for the instance at the database.

One of many advantages of automated management of business processes is that a user can monitor and respond to events occurring across multiple instances. These may include events such as, for example, service start, end, and error information, message in and message out metadata information, and debugging and trace data and message bodies. For each event, corresponding event data is gathered. This event data may be used to alert the business to an error or problem within an instance or across instances or to notify the business of a required action or response. Additionally, detailed event data may be used to compile a comprehensive report on the history and real-time state of any instance of a business process. Thus, it is important that business process orchestration technology provide detailed event data in an efficient and reliable manner.

Furthermore, it is often desirable to analyze and manage event data in a format that is easily comprehended and manipulated. A user may wish to analyze event data according to various attributes corresponding to the events. These may include attributes such as, for example, the type of event, the time at which the event occurred, and the instance to which the event corresponds. In addition, a user may wish to create hierarchies within each attribute. For example, a user may wish to analyze events according to the time at which each event occurred and to group each event according to the date on which it occurred. Data grouped according to date may also be sub-grouped according to, for example, the hour on which it occurred.

Business orchestration technology generally collects event data during the course of performing an operation to modify state data corresponding to an instance of a process. In existing technology, event data is committed to storage at the database upon its collection. A drawback of committing to store upon collection, however, is that a single operation may fail multiple times before the operation succeeds. This is because a server may, for example, crash or lose its connection with the database before the operation is fully performed. Upon failure, the operation is typically transferred to another server which again attempts to successfully perform the operation. Thus, event data corresponding to a single event may be collected multiple times by different servers and stored multiple times at the database. Multiple storage results in multiple data entries for a single event, thereby creating several "false" error alerts or "false" entries in a process report or history.

Existing technology is also limited in that it does not enable a user to select the events corresponding to which he or she wishes to collect data, thereby filling the database with irrelevant and/or unwanted event data. Thus, the user is forced to disregard unwanted alerts and to manually filter out unimportant events from a report or history. Furthermore, existing technology does not enable event data to be analyzed and managed in a format that is easily comprehended and manipulated. In existing business process orchestration technology, event data is stored in a serialized data stream that is not formatted for analysis according to the attributes of the event data.

Thus, a need exists in the art for a system and method for collecting and storing event data from distributed transactional applications that commits event data corresponding to an operation on an instance of a process only after the operation on the instance succeeds. Furthermore, a system and method is needed that enables a user to collect data corresponding to events that are pre-selected by a user and that presents the event data in a format that enables users to easily analyze the data.

SUMMARY OF THE INVENTION

Accordingly, in the present invention, a system and method for collecting and storing event data from distributed transactional applications is disclosed. Data corresponding to the state of an instance of a process is stored at a database. When the state of an instance changes, a server performs an operation to modify the data corresponding to the state of the instance. During the course of the performance of the operation, an interceptor collects event data associated with the modifications to the state data. After the operation has been successfully performed, the modified state data and the associated event data are committed to the database in the same transaction.

Event data stored at the database is transmitted to a tracking service. The tracking service converts the event data into a form storable in a query-able database and stores the converted data. Event data in the query-able database includes data corresponding to a plurality of event items, and the data is stored according to the instance to which the event item corresponds and also according to the operation. In one embodiment, event items corresponding to an instance are organized according to a plurality of data tables, where each table represents an attribute of the data. Furthermore, data may be organized according to plurality of dimensions, wherein each dimension comprises a hierarchy of levels corresponding to the columns in each data table. Data organized according to a plurality of dimensions may be aggregated to perform queries on the data.

BRIEF DESCRIPTION OF THE DRAWINGS

The illustrative embodiments will be better understood after reading the following detailed description with reference to the appended drawings, in which.

DETAILED DESCRIPTION

Figure 1:
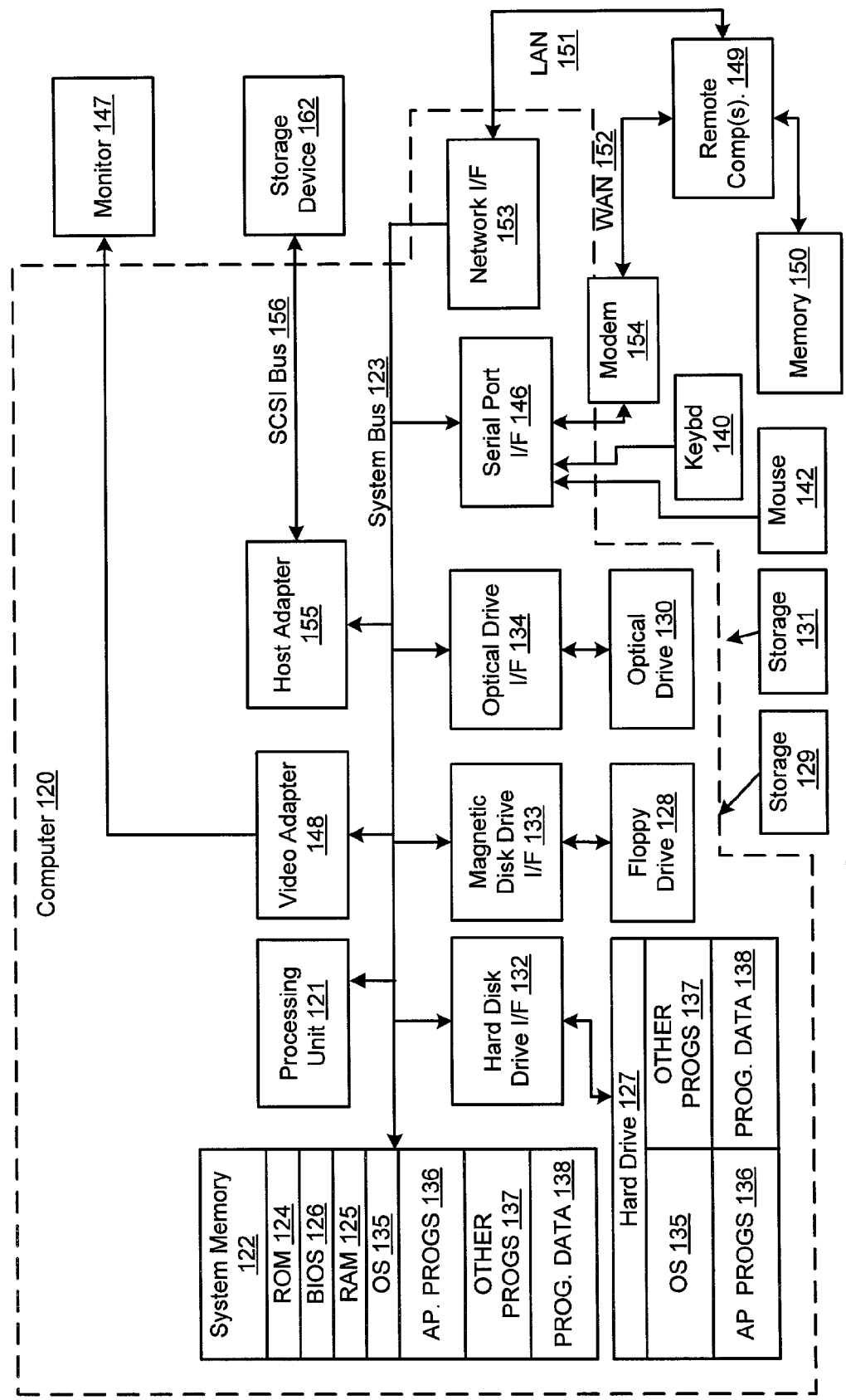
FIG. 1 is a block diagram representing a general purpose computer system in which aspects of the present invention and/or portions thereof may be incorporated.

A system and method for collecting and storing event data in connection with business orchestration technology are described below with reference to the aforementioned drawings. Those skilled in the art will readily appreciate that the description given herein with respect to those drawings is for explanatory purposes only and is not intended in any way to limit the scope of the invention to the specific embodiments shown. Throughout the description, like reference numerals are employed to refer to like elements in the respective figures.

Computer Environment

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including handheld devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

System and Method of the Present Invention

Figure 2:
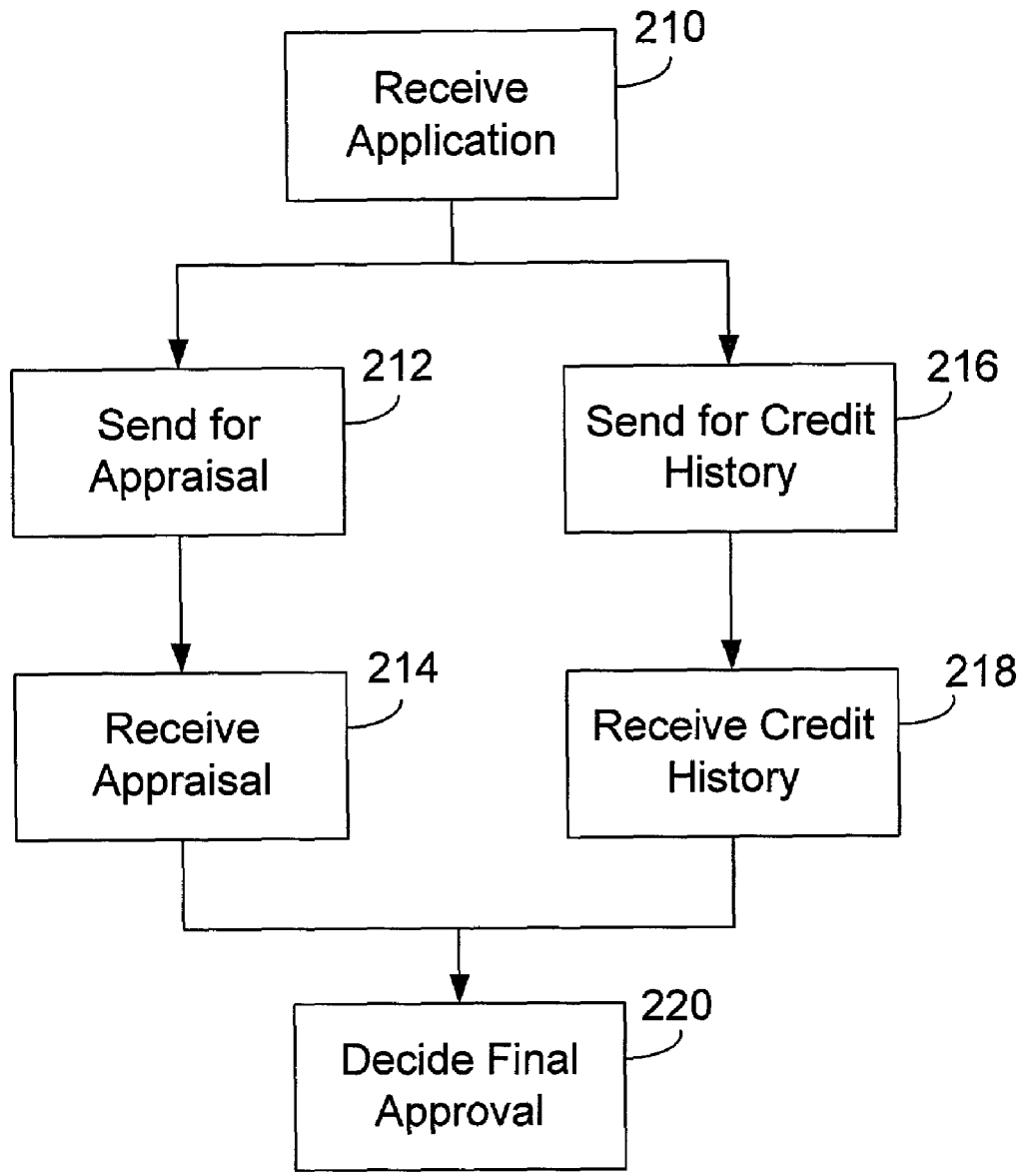
FIG. 2 is a flowchart of an illustrative business process managed by a business orchestration technology product.

As discussed above, a business processes such as the process shown in FIG. 2 is automated using business orchestration technology such as, for example, BIZTALK server from MICROSOFT corporation of Redmond, Wash. As may be appreciated, the business process shown in FIG. 2 is for receiving and approving an application for a loan, and includes multiple services. At step 210, a business receives the application for the loan. At step 212, the business sends for an appraisal of the collateral. At step 214, the business receives the appraisal of the collateral. At step 216, the business sends for a credit history of the applicant. At step 218, the business receives the credit history of the applicant. Note that steps 212 and 216 above are performed in parallel and that steps 214 and 218 must both be completed before reaching step 220. At step 220, final approval for the loan is decided by the business. For each instance of this process, state data is modified and stored and event data is collected and stored according to the system and method described below.

Figure 3:
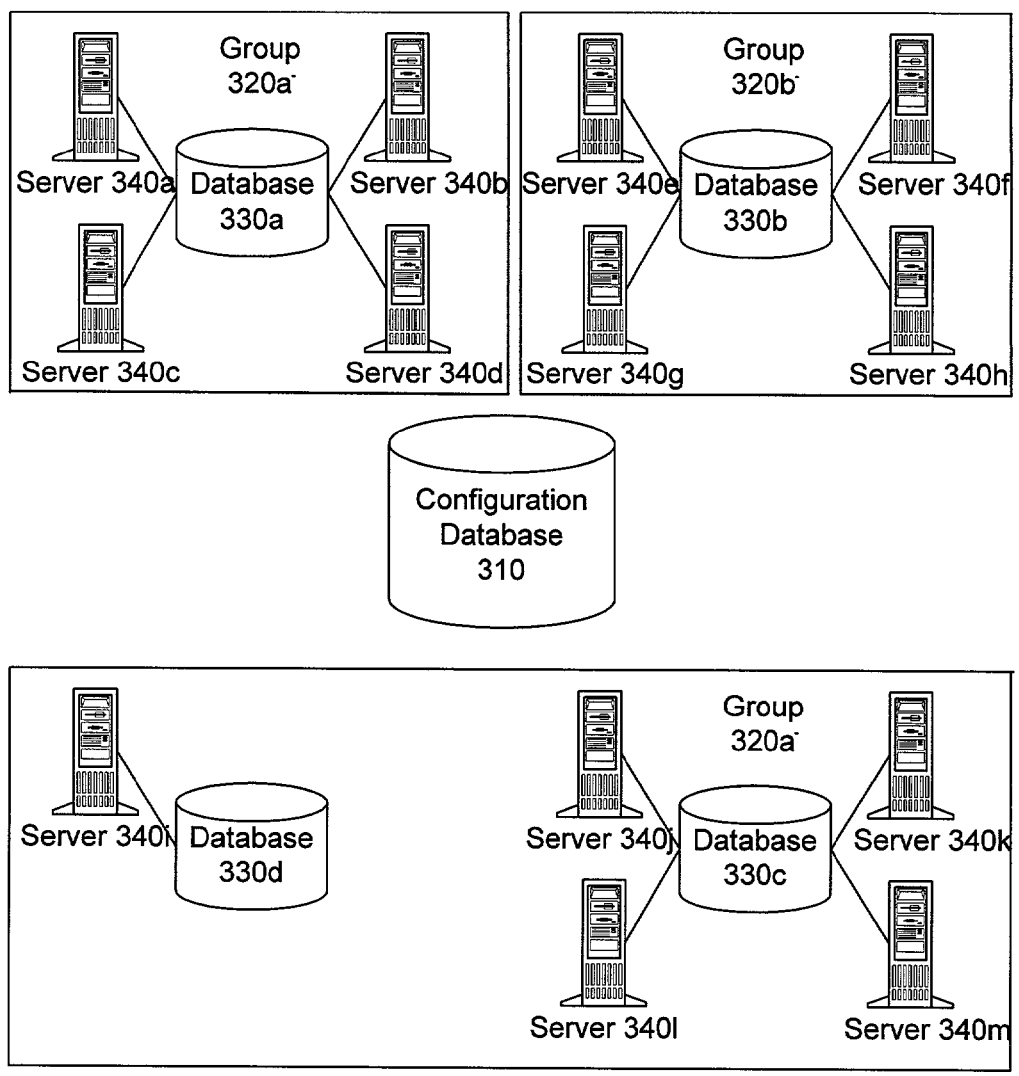
FIG. 3 is a block diagram of a prior art system for modifying and storing state data corresponding to an instance of a business process.

Referring now to FIG. 3, the storing and modification of state data corresponding to an instance of a process may be divided between administrative groups 320a–c. All data corresponding to a particular instance may be stored and modified by a single group 320a–c. For example, all data corresponding to the loan application of Jim Smith may be assigned to group 320b. The identity of each instance and its assigned administrative group 320a–c are stored in configuration database 310. When the state of a particular instance must be changed, the configuration database 310 routes the processing to the instance's corresponding assigned group 320a–c so that the state data corresponding to the instance can be accordingly modified and stored at the group 320a–c.

As shown in FIG. 3, each administrative group 320a–c comprises one or more databases 330a–d. Data corresponding to the current state of an instance of a process is stored at the database 330a–d in the group 320a–c dedicated to the instance. For example, database 330b in group 320b may store the state data for the loan application of Jim Smith. Each database 320a–d is dedicated to one or more servers 340–346a–d. When an external event prompts the system to modify the state data corresponding to an instance, the state data is retrieved by a server 340a–m in the instance's dedicated group 320a–d so that the server 340a–m can perform an operation to modify the state data. For example, when Jim Smith's credit report is received, server 340g from group 320b may perform an operation to obtain the state data from database 330b and modify same to reflect that Smith's credit report has been received. After the operation is fully and successfully performed, the modified state data is transmitted back to database 330b for storage thereat. If the server 340g crashes or loses connection with the database 330b before the operation is fully performed, then the state data is sent to another server 340e, 340f, or 340h within the group 320b to again attempt to perform the operation in its entirety.

Figure 4:
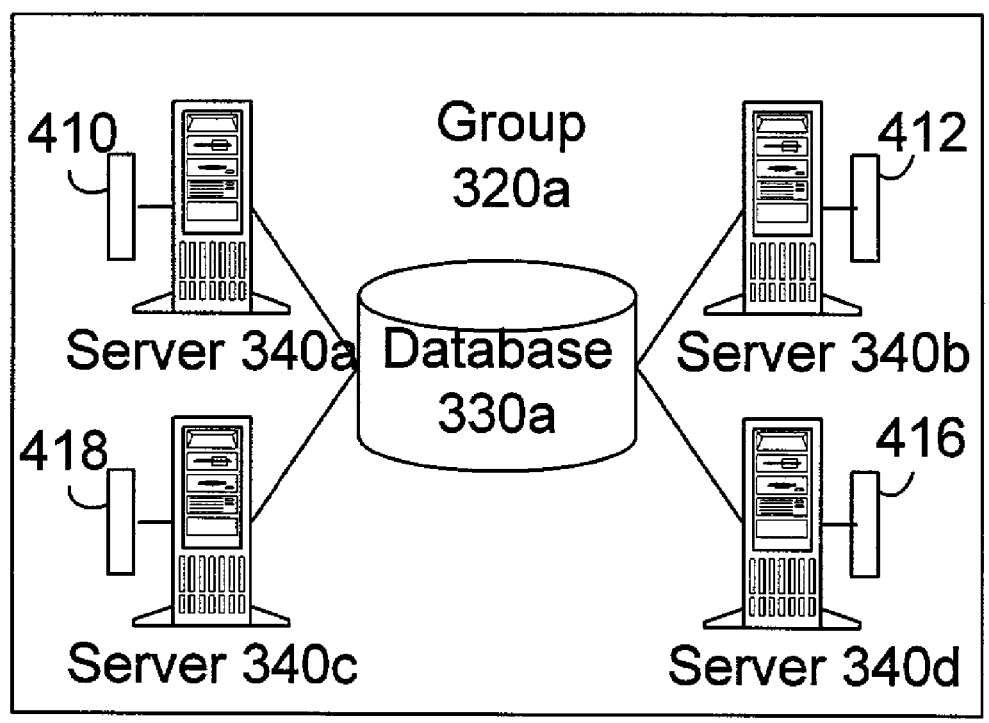
FIG. 4 is a block diagram of a system for collecting and storing event data corresponding to an instance of a business process in accordance with one embodiment of the present invention.

Referring now to FIG. 4 where only group 320a is shown, in one embodiment of the present invention an interceptor 410–416 runs on each server 340a–d to collect event data associated with each operation to modify the state data by the server 340a–d on which the interceptor 410–416 is running. Each interceptor 410–416 may be provisioned as hardware coupled to the server 340a–d or as software running on the server 340a–d. The event data collected by each interceptor 410–416 for each operation may comprise a plurality of event items. Each event item corresponds to an event such as, for example, service start, end, and error information, message in and message out metadata information, and debugging and trace data and message bodies. The event data collected by each interceptor 410–416 may consist of a standard set of event items or may consist of a set of event items that is pre-selected by a user.

The event data collected by each interceptor 410–416 is transmitted to the database 330a for storage thereat. In one embodiment of the present invention, the transmission of the event data occurs as part of the transmission of the state data with which the event data is associated. As discussed previously with reference to FIG. 2, modified state data is transmitted from server 340a–d to database 330a only after the operation to modify the state data has been successfully fully performed by the server 340a–d. Thus, and correspondingly, event data is transmitted from a server 340a–d to database 330a only after the operation to modify the state data associated with the event data has been successfully fully performed by the server 340a–d.

Figure 5:
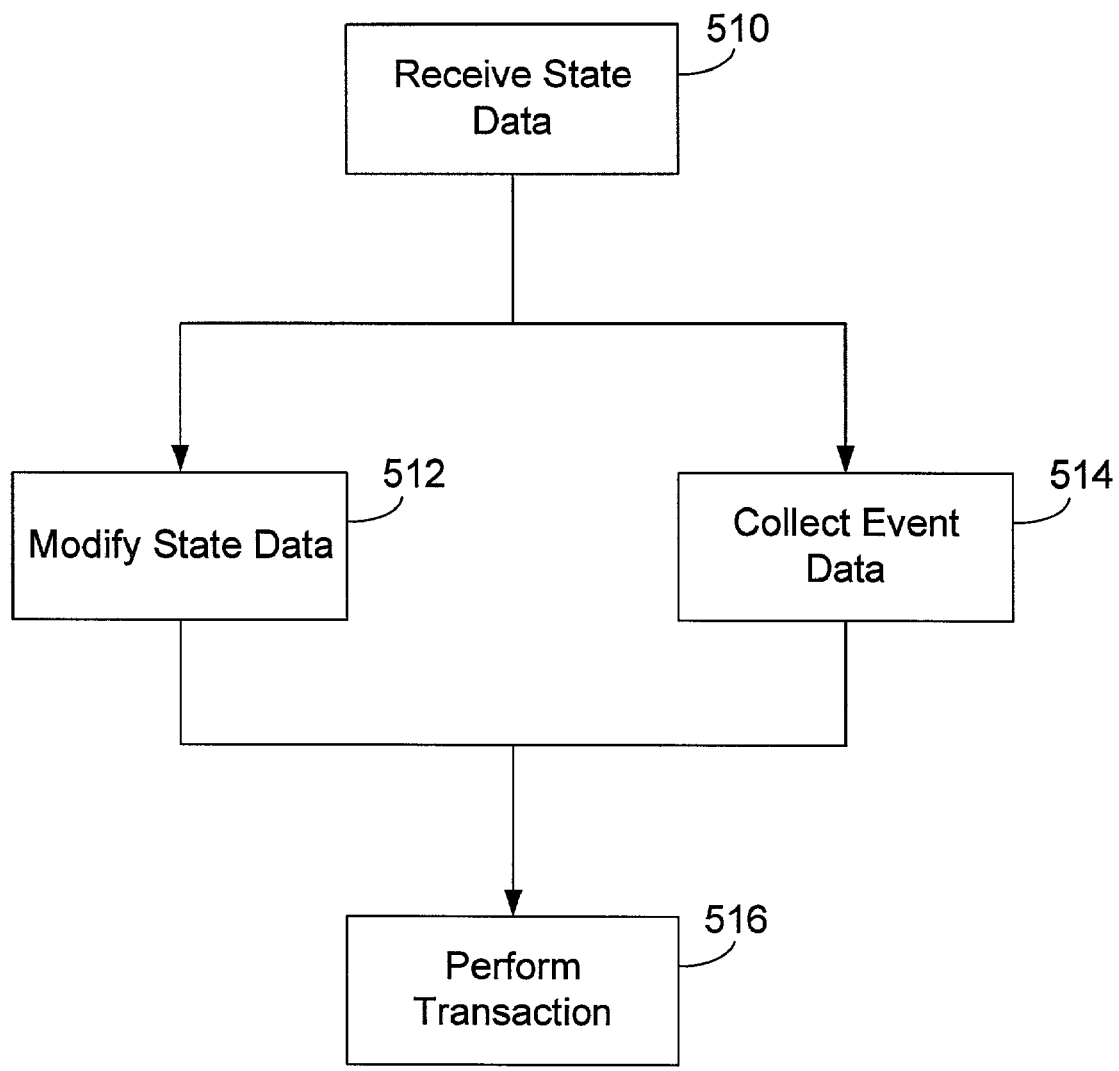
FIG. 5 is a flowchart of a method for collecting and storing event data corresponding to an instance of a business process in accordance with one embodiment of the present invention.

FIG. 5 is a flowchart of a method for collecting and storing event data corresponding to modification of state data of an instance of a business process in accordance with one embodiment of the present invention. At step 510, a server 340a–d retrieves from database 330a state data corresponding to an instance of a process to perform an operation to modify the state data. At step 512, such server 340a–d performs the operation to modify the state data. At step 514, and concurrently, the interceptor 410-416 corresponding to the server 340a–d collects event data associated with the operation to modify the state data. At step 516, the server 340a–d performs a transaction with database 330a to store both the modified state data and the associated event data at database 330a. Significantly, if the operation to modify the state data at step 512 has been successfully, fully performed by server 340a–d, and if the transaction with database 330a succeeds, both the modified state data and the associated event data are stored at database 330a. Correspondingly, if the operation to modify the state data at step 512 by server 340a–d fails or if the transaction with database 330a fails, both the modified state data and the associated event data are not stored at database 330a. As seen, if the operation or the transaction fails, then, at step 510, another server 340a–d receives the state data and the method is repeated until the transaction succeeds.

When the transaction at step 516 succeeds, database 330a receives and stores the event data. Database 330a, however, is limited in that it is not configured to analyze the event data. Instead database 330a merely stores the event data in a serialized data stream. As should be appreciated, such serialized data stream is not a format that enables a user to easily comprehend and query the event data. Additionally, database 330a is limited in that, because there may be more than one database 330a–d in a group 320a–c, as in group 320c, event data corresponding to an instance may be divided between a plurality of the databases 330a–d. Thus, event data stored in a data stream at each database 330a–d must be collected and organized into a single stream and stored in a format that enables the user to easily comprehend and manipulate the data.

Figure 6:
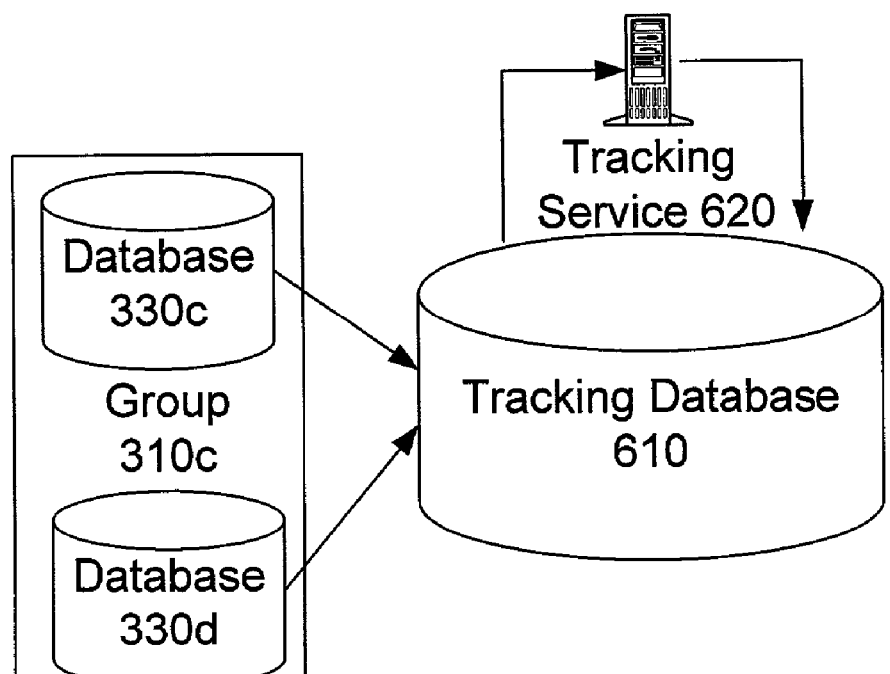
FIG. 6 is a block diagram of an illustrative system for converting event data collected from business orchestration technology into query-able data in accordance with one embodiment of the present invention.

Referring now to FIG. 6, it is seen that databases 310c,d in group 320c store a stream of event data corresponding to multiple ones of the instances to which group 320c is dedicated. In one embodiment of the present invention, each stream of event data is transmitted to tracking database 610 using a transactional reliable medium such as SQL transactional replication. Tracking database 610 collects and may organize the data stream from each database 330c,d into a single data stream or handle each data stream separately. In addition, tracking service 620 runs at tracking database 610 to reformat the single data stream or each data stream into a query-able format that enables a user to comprehend and query the event data. In particular, tracking service 620 reads each event item in a data stream and applies a method to the event item to convert the event item into the query-able format. Of course, the method may vary depending on the query-able format, the type of event item, etc., and may be specified internal or external to the event item.

In one embodiment of the present invention, event items corresponding to an instance are organized according to a plurality of data tables, where each table represents an attribute of the data. Data may be organized according to attributes such as, for example, the time of the event item, the type of event item, and an identifier identifying each event item.

Furthermore, data may be formatted for online analytical processing (OLAP). Data formatted for OLAP is organized into a cube comprising a plurality of dimensions, wherein each dimension represents an attribute if the data. One cube may, for example, represent the event items according to instances, while another cube may represent the event items according to the operation performed. Dimensions in an OLAP cube may also be organized according to hierarchies within each attribute of the data. For example, event items may be organized according to the time at which each event occurred and grouped according to the date on which each event occurred. Data grouped according to date may also be sub-grouped according to the hour on which it occurred. Organizing data according to its attributes enables the data to be easily aggregated and queried by a user.

Thus, systems and methods for collecting and storing event data from business orchestration technology have been disclosed. These systems and methods eliminate the problem of storing "false" event items because each event item is comitted at the database only after the operation on the state data associated with the event item has been successfully, fully performed. Additionally, these systems and methods allow a user to pre-select event items corresponding to which he or she wishes to collect event data. These systems and methods also convert collected event items into a query-able format that is allows the data to be easily comprehended and queried.

While the invention has been described and illustrated with reference to specific embodiments, those skilled in the art will recognize that modifications and variations may be made without departing from the principles of the invention as described above and set forth in the following claims. For example, while the invention has been described with reference to business process orchestration technology such as the BIZTALK software application from MICROSOFT corporation of Redmond, Wash., the invention may be used in conjunction with any applicable distributed transactional application. Furthermore, the invention is not limited to the examples of query-able formats of data storage described herein. Accordingly, reference should be made to the appended claims as indicating the scope of the invention.

We claim:

1. A method for collecting tracking data, comprising:
retrieving from a database state data corresponding to an instance of a process;
performing an operation on the instance to modify the state data;
collecting event data associated with the operation; and
performing a single transaction with the database to store both the modified state data and the associated event data at such database, the transaction either succeeding or failing, whereby if the transaction succeeds, then, as a result of the single transaction, both the state data and the event data are stored at the database with the event data being stored in a serialized data stream separate from the state data, and if the transaction fails, then both the state data and the event data are not stored at the database.

2. The method of claim 1, wherein retrieving state data from a database comprises retrieving at a server state data from a database.

3. The method of claim 1, wherein performing an operation on the instance to modify the state data comprises performing at a server an operation on the instance to modify the state data.

4. The method of claim 3, wherein collecting event data associated with the operation comprises collecting at an interceptor running on the server event data associated with the operation.

5. The method of claim 1, wherein collecting event data comprises collecting event data corresponding to pre-selected events with regard to the transaction.

6. The method of claim 5, wherein collecting event data corresponding to pre-selected events with regard to the transaction comprises collecting at least one of service start, service end, and service error data.

7. The method of claim 5, wherein collecting event data corresponding to pre-selected events with regard to the transaction comprises collecting at least one of message in and message out metadata information.

8. The method of claim 5, wherein collecting event data corresponding to pre-selected events with regard to the transaction comprises collecting at least one of debugging data, trace data, and message bodies.

9. The method of claim 1, wherein performing a single transaction with the database comprises performing a single transaction wherein data is transmitted from a server to the database.

10. The method of claim 1, comprising performing the single transaction only after the operation to modify the state data has been fully performed and the event data has been fully collected.

11. A system for collecting tracking data, comprising:
a database for storing state data corresponding to an instance of a process;
a server for retrieving the state data from the database, performing an operation on the instance to modify the state data, and performing a single transaction with the database to store both the modified state data and the associated event data at the database, the transaction either succeeding or failing, whereby if the transaction succeeds, then, as a result of the single transaction, both the state data and the event data are stored at the database with the event data being stored in a serialized data stream separate from the state data, and if the transaction fails, then both the state data and the event data are not stored at the database; and
an interceptor for collecting the event data.

12. The system of claim 11, wherein said interceptor comprises an interceptor running at said server.

13. A computer readable medium having stored thereon computer executable instructions implementing a method for collecting tracking data, the method comprising:
retrieving from a database state data corresponding to an instance of a process;
performing an operation on the instance to modify the state data;
collecting event data associated with the operation; and
performing a single transaction with the database to store both the modified state data and the associated event data at such database, the transaction either succeeding or failing, whereby if the transaction succeeds, then, as a result of the single transaction, both the state data and the event data are stored at the database with the event data being stored in a serialized data stream separate from the state data, and if the transaction fails, then both the state data and the event data are not stored at the database.

14. The medium of claim 13, wherein retrieving state data from a database comprises retrieving at a server state data from a database.

15. The medium of claim 13, wherein performing an operation on the instance to modify the state data comprises performing at a server an operation on the instance to modify the state data.

16. The medium of claim 15, wherein collecting event data associated with the operation comprises collecting at an interceptor running on the server event data associated with the operation.

17. The medium of claim 13, wherein collecting event data comprises collecting event data corresponding to pre-selected events with regard to the transaction.

18. The medium of claim 17, wherein collecting event data corresponding to pre-selected events with regard to the transaction comprises collecting at least one of service start, service end, and service error data.

19. The medium of claim 17, wherein collecting event data corresponding to pre-selected events with regard to the transaction comprises collecting at least one of message in and message out metadata information.

20. The medium of claim 17, wherein collecting event data corresponding to pre-selected events with regard to the transaction comprises collecting at least one of debugging data, trace data, and message bodies.

21. The medium of claim 13, wherein performing a single transaction with the database comprises performing a single transaction wherein data is transmitted from a server to the database.

22. The medium of claim 13, wherein the method comprises performing the single transaction only after the operation to modify the state data has been fully performed and the event data has been fully collected.

* * * * *